US011038387B2

United States Patent
Yamashita et al.

(10) Patent No.: US 11,038,387 B2
(45) Date of Patent: Jun. 15, 2021

(54) MOTOR AND METHOD FOR MANUFACTURING MOTOR

(71) Applicant: DENSO CORPORATION, Aichi-pref. (JP)

(72) Inventors: Yuuji Yamashita, Toyohashi (JP); Takafumi Yamano, Toyohashi (JP)

(73) Assignee: DENSO CORPORATION, Aichi-pref. (JP)

( * ) Notice: Subject to any disclaimer, the term of this patent is extended or adjusted under 35 U.S.C. 154(b) by 264 days.

(21) Appl. No.: 15/895,249

(22) Filed: Feb. 13, 2018

(65) Prior Publication Data

US 2018/0241261 A1  Aug. 23, 2018

(30) Foreign Application Priority Data

Feb. 23, 2017 (JP) .............................. JP2017-032519
Feb. 23, 2017 (JP) .............................. JP2017-032520

(51) Int. Cl.
*H02K 1/18* (2006.01)
*H02K 5/22* (2006.01)
(Continued)

(52) U.S. Cl.
CPC .............. *H02K 1/185* (2013.01); *H02K 1/16* (2013.01); *H02K 3/12* (2013.01); *H02K 5/225* (2013.01); *H02K 15/028* (2013.01); *H02K 11/33* (2016.01)

(58) Field of Classification Search
CPC .......... H02K 1/185; H02K 5/225; H02K 1/16; H02K 3/12; H02K 15/028; H02K 11/33; H02K 15/026
(Continued)

(56) References Cited

U.S. PATENT DOCUMENTS 2,023,259 A * 12/1935 Anderson .............. H02K 1/185
                                                        310/402
2014/0210306 A1* 7/2014 Suzuki ..................... H02K 5/15
                                                        310/216.134

FOREIGN PATENT DOCUMENTS

JP       S50-43206 U      5/1975
JP       11089126 A   *  3/1999
(Continued)

OTHER PUBLICATIONS

Machine Translation, Horizumi, JP-2015201920-A, Nov. 2015. (Year: 2015).*
(Continued)

*Primary Examiner* — Thomas Truong
(74) *Attorney, Agent, or Firm* — Kilpatrick Townsend & Stockton LLP (57) ABSTRACT

A motor includes a stator, a first frame, a second frame, and a fastening member. The stator includes a stator core including a plurality of teeth extending radially inward and an armature winding wound around the teeth. The first frame is arranged to cover one axial end surface side of the stator. The second frame is arranged to cover another axial end surface side of the stator. The fastening member fastens the first frame and the second frame to each other with the stator core held by the first frame and the second frame in the axial direction. The circumference of the stator core and the circumference of at least one of the first frame and the second frame each include a circumferential positioning recess. The circumferential positioning recess is arranged at a circumferential reference position and is outwardly open in the radial direction.

6 Claims, 6 Drawing Sheets

(51) Int. Cl.
*H02K 15/02* (2006.01)
*H02K 3/12* (2006.01)
*H02K 1/16* (2006.01)
*H02K 11/33* (2016.01)

(58) Field of Classification Search
USPC .................................................. 310/216.049
See application file for complete search history.

(56) References Cited

FOREIGN PATENT DOCUMENTS

| JP | H11-89126 A | 3/1999 |
| JP | H1189126 A | 3/1999 |
| JP | 2014147175 A | 8/2014 |
| JP | 2015201920 A * | 11/2015 |

OTHER PUBLICATIONS

Machine Translation, Fujita, JP-11089126-A, Mar. 1999. (Year: 1999).*

* cited by examiner

MOTOR AND METHOD FOR MANUFACTURING MOTOR

BACKGROUND ART

The present disclosure relates to a motor and a method for manufacturing a motor.

Japanese Laid-Open Patent Publication No. 2019-47175A describes one example of a prior art motor including a stator that includes a stator core having a plurality of teeth extending radially inward and an armature winding wound around the teeth. With the stator core held by a first frame and a second frame in an axial direction, the first frame and the second frame are fastened by bolts.

In a motor such as that described above, when the stator core is coupled to the first frame and the second frame, positioning needs to be performed in the circumferential direction. Thus, for example, each of the first frame and the second frame may simply have a positioning structure that restricts rotation relative to the stator core in the circumferential direction. In this case, as the positioning is performed in the circumferential direction, the stator core needs to be relatively moved and coupled to the first frame and the second frame in the axial direction. When the above positioning structure is not provided, after the stator core is relatively moved and coupled to the first frame and the second frame in the axial direction, the positioning is performed in the circumferential direction. The circumferential positioning needs to be maintained when bolting. Thus, the coupling is complicated.

Additionally, in a motor such as that described above, the armature winding of the stator may have groups of winding ends separated from each other by 180 degrees. In such a case, the stator core may be erroneously coupled to the first frame and the second frame at a relative position where the stator is misaligned with the first frame and the second frame by 180 degrees in the circumferential direction. Such erroneous coupling causes one group of the winding ends to be erroneously connected to an electric circuit component that is to be connected to another group of the winding ends. This ultimately causes production of a defect.

SUMMARY OF THE INVENTION

It is an object of the present disclosure to provide a motor that facilitates coupling and a method for manufacturing a motor.

To achieve the above object, a first aspect of the present disclosure is a motor that includes a stator, a first frame, a second frame, and a fastening member. The stator includes a stator core including a plurality of teeth inwardly extending in a radial direction and an armature winding wound around the teeth. The first frame is arranged to cover one end surface side of the stator in an axial direction. The second frame is arranged to cover another end surface side of the stator in the axial direction. The fastening member fastens the first frame and the second frame to each other with the stator core held by the first frame and the second frame in the axial direction. Each of the stator core, the first frame, and the second frame includes a circumference. The circumference of the stator core and the circumference of at least one of the first frame and the second frame each include a circumferential positioning recess. The circumferential positioning recess is arranged at a circumferential reference position and is outwardly open in the radial direction.

A second aspect of the present disclosure is a motor that includes a stator, a first frame, a second frame, and a fastening member. The stator includes a stator core, which includes a plurality of teeth inwardly extending in a radial direction and a plurality of accommodation recesses that are outwardly open in the radial direction and arranged in a circumferential direction, and an armature winding wound around the teeth. The first frame is arranged to cover one end surface side of the stator in an axial direction. The second frame is arranged to cover another end surface side of the stator in the axial direction. The fastening member fastens the first frame and the second frame to each other with the stator core held by the first frame and the second frame in the axial direction. At least one of the accommodation recesses serves as a fastening member accommodation recess. The fastening member accommodation recess partially accommodates the fastening member. Each of the stator core and at least one of the first frame and the second frame includes an erroneous coupling restriction portion that allows coupling in the axial direction only when a relative position of the stator core and at least one of the first frame and the second frame is set to a predetermined position in the circumferential direction.

A third aspect of the present disclosure is a method for manufacturing a motor. The motor includes a stator, a first frame, a second frame, and a fastening member. The stator includes a stator core including a plurality of teeth inwardly extending in a radial direction and an armature winding wound around the teeth. The first frame is arranged to cover one end surface side of the stator in an axial direction. The second frame is arranged to cover another end surface side of the stator in the axial direction. The fastening member fastens the first frame and the second frame to each other with the stator core held by the first frame and the second frame in the axial direction. The method includes coupling the first frame, the stator core, and the second frame to each other in the axial direction by relatively moving the first frame, the stator core, and the second frame in the axial direction. The method further includes forming a circumferential positioning recess in a circumference of the stator core and a circumference of at least one of the first frame and the second frame. Each of the circumferential positioning recesses is outwardly open in the radial direction. The method further includes inserting a jig into the circumferential positioning recesses extending over the circumferential positioning recesses. The method further includes fastening the first frame and the second frame to each other with a fastening member with the positions of the stator core and at least one of the first frame and the second frame maintained.

Other aspects and advantages of the embodiments will become apparent from the following description, taken in conjunction with the accompanying drawings, illustrating by way of example the principles of the invention.

BRIEF DESCRIPTION OF THE DRAWINGS

The embodiments, together with objects and advantages thereof, may best be understood by reference to the following description of the presently preferred embodiments together with the accompanying drawings in which.

DETAILED DESCRIPTION OF THE PREFERRED EMBODIMENTS

One embodiment will now be described with reference to FIGS. 1 to 8.

Figure 1:
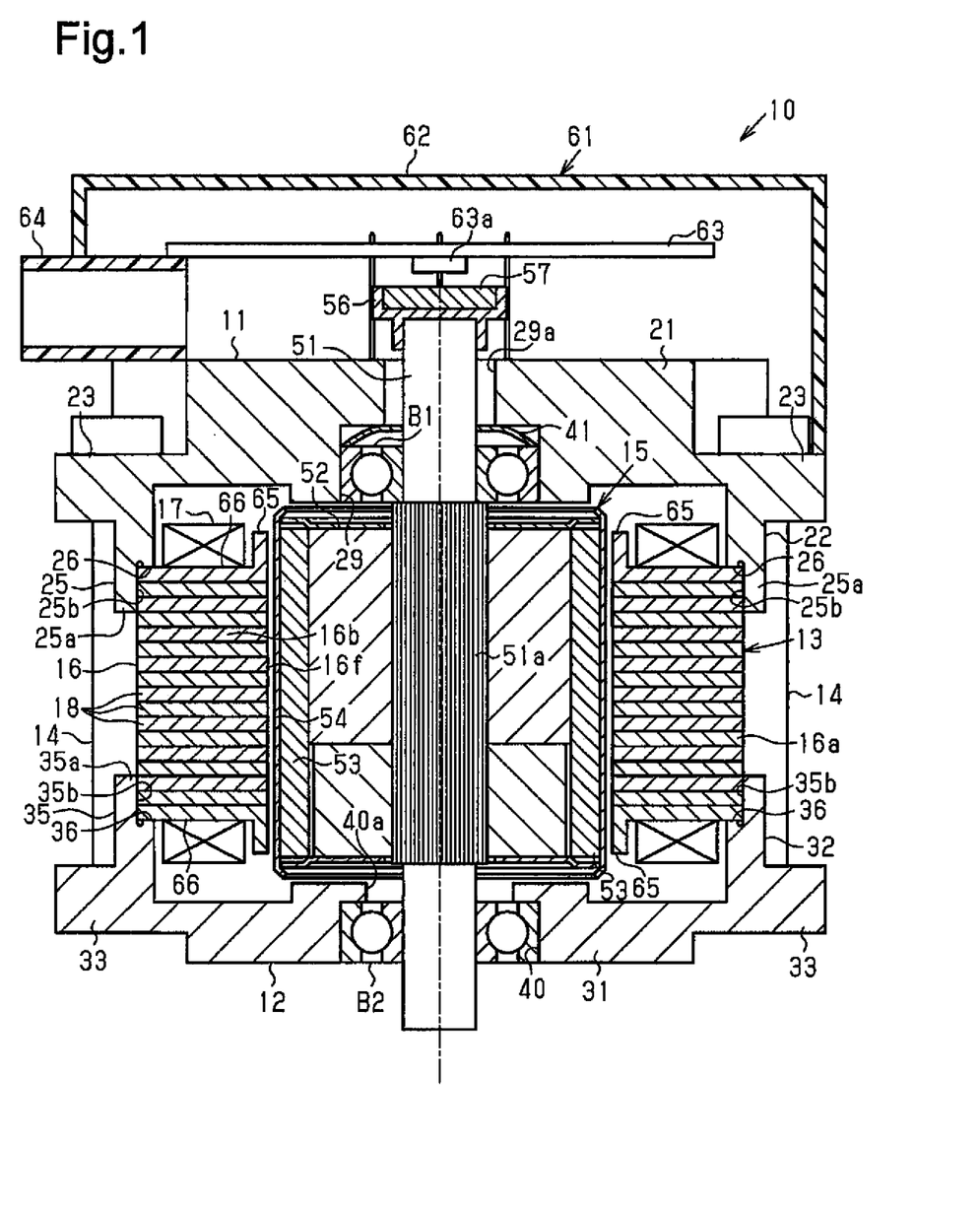
FIG. 1 is a cross-sectional view showing the schematic structure of one embodiment of a motor according to the present disclosure.

As shown in FIG. 1, a motor 10 has a structure in which an annular stator 13 is held by a first frame 11 and a second frame 12 in a rotational axial direction. The first frame 11 and the second frame 12 are fixed (fastened) to each other by a plurality of (in present embodiment, two) through bolts 14, which are located at the outer circumference of the stator 13 and serve as fastening members. Additionally, a rotor 15 is located at an inner side of the stator 13 in a rotatable manner. In the present embodiment, an end frame that holds the stator 13 at a non-output side of the motor 10 in the axial direction (upper side in FIG. 1) is referred to as the first frame 11, and an end frame that holds the stator 13 at an output side in the axial direction is referred to as the second frame 12.

Figure 2:
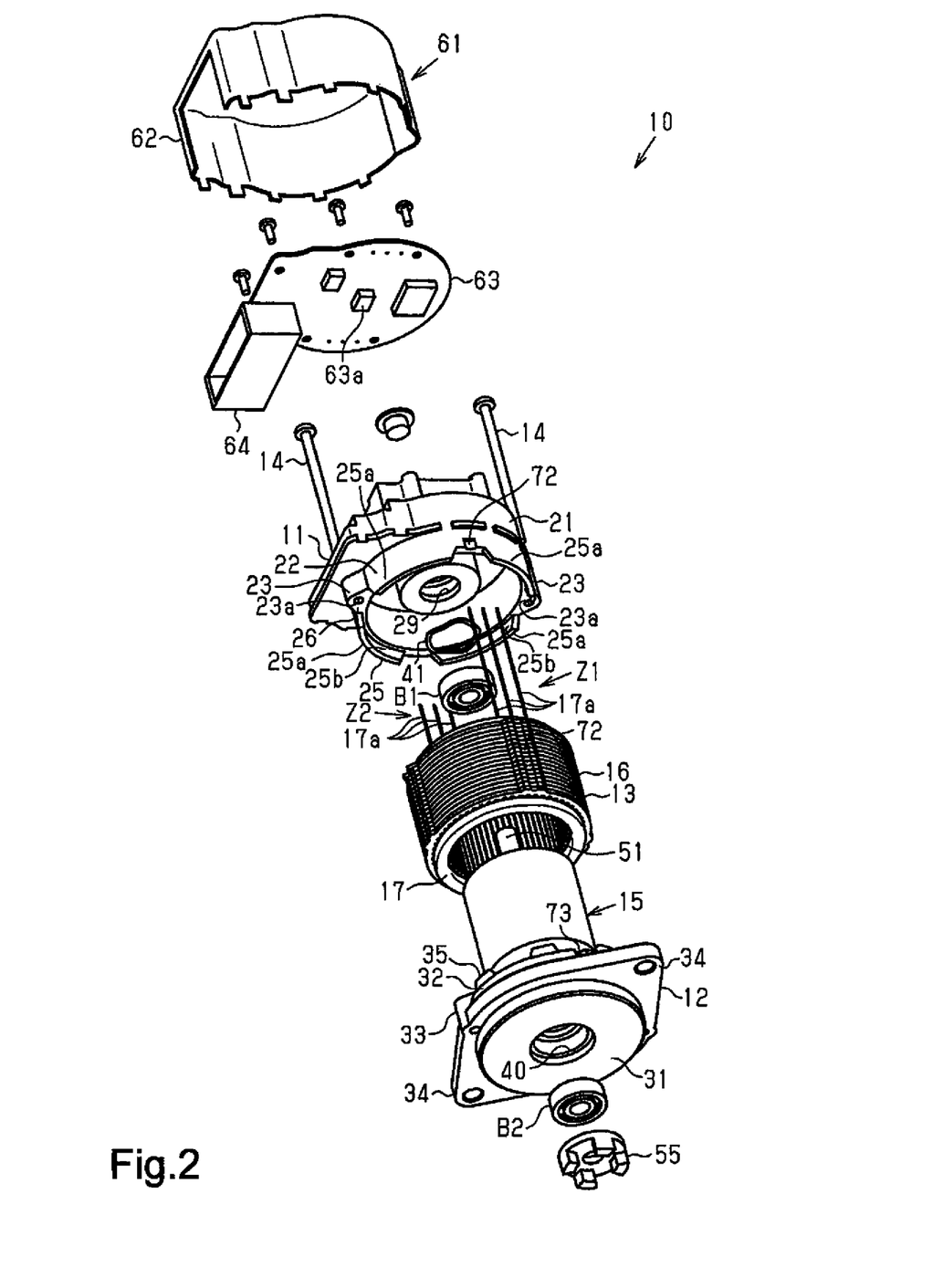
FIG. 2 is an exploded perspective view of the motor shown in FIG. 1.

As shown in FIGS. 1 and 2, the stator 13 includes an annular stator core 16 and armature windings 17 wound around the stator core 16. As shown in FIG. 3B, the stator core 16 includes a ring-shaped annular portion 16a, a plurality of (in present embodiment, sixty) teeth 16b inwardly extending in the radial direction from the annular portion 16a and arranged in the circumferential direction, and four core circumference projections 16c outwardly projecting in the radial direction from an outer circumferential surface of the annular portion 16a and extending in the axial direction. The outer circumferential surface of the annular portion 16a is annular. The annular portion 16a has two axial end surfaces that are flat and orthogonal to the axial direction. The armature windings 17 are distributed windings, in which the armature windings 17 are wound over a plurality of teeth 16b. The armature windings 17 are provided for each of three phases (U-phase, V-phase, W-phase) and include a number of segment conductors connected to one another at axial ends. The armature windings 17 include wiring ends 17a (refer to FIG. 2) extending through the first frame 11 toward one side in the axial direction. More specifically, the armature winding 17 for each phase (of three phases) has one wiring end 17a. The winding ends 17a form one group Z1 at a position close to each other in the circumferential direction and extend toward one side in the axial direction. The armature windings 17 for each phase has a further wiring end 17a. The further wiring ends 17a form a further group Z2 at a position close to each other in the circumferential direction and extend toward one side in the axial direction at a position separated from the one group Z1 by 180 degrees.

Figure 3A:
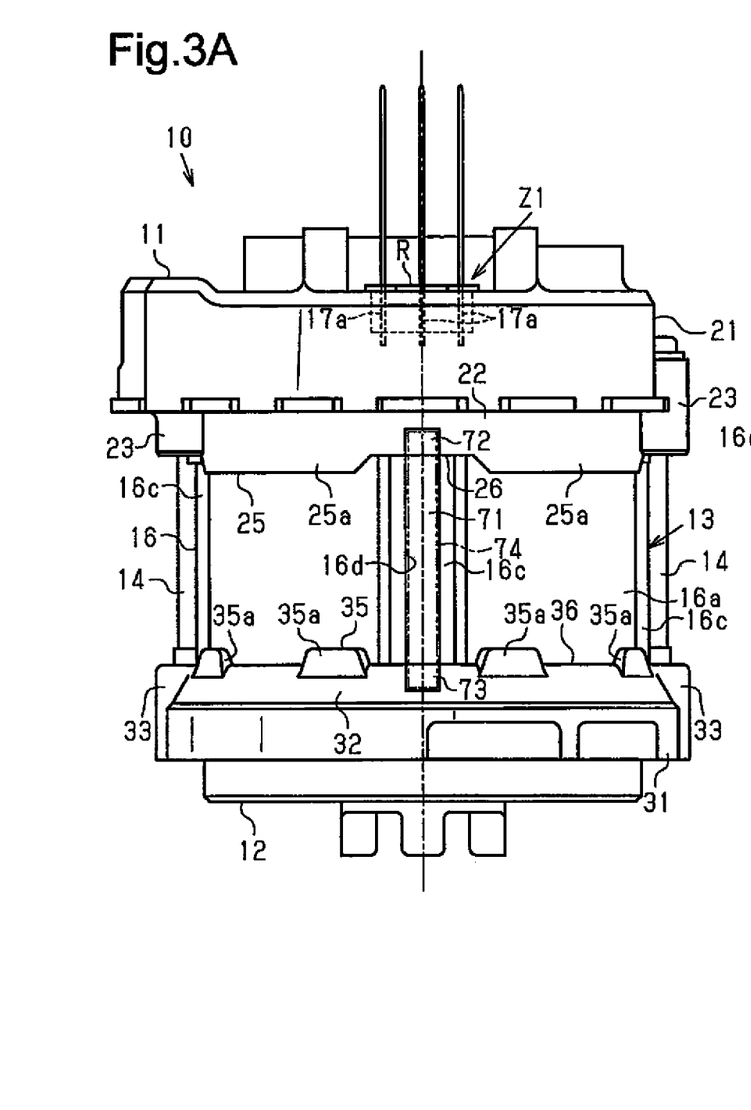
FIG. 3A is a side view of the motor shown in FIG. 2.
Figure 3B:
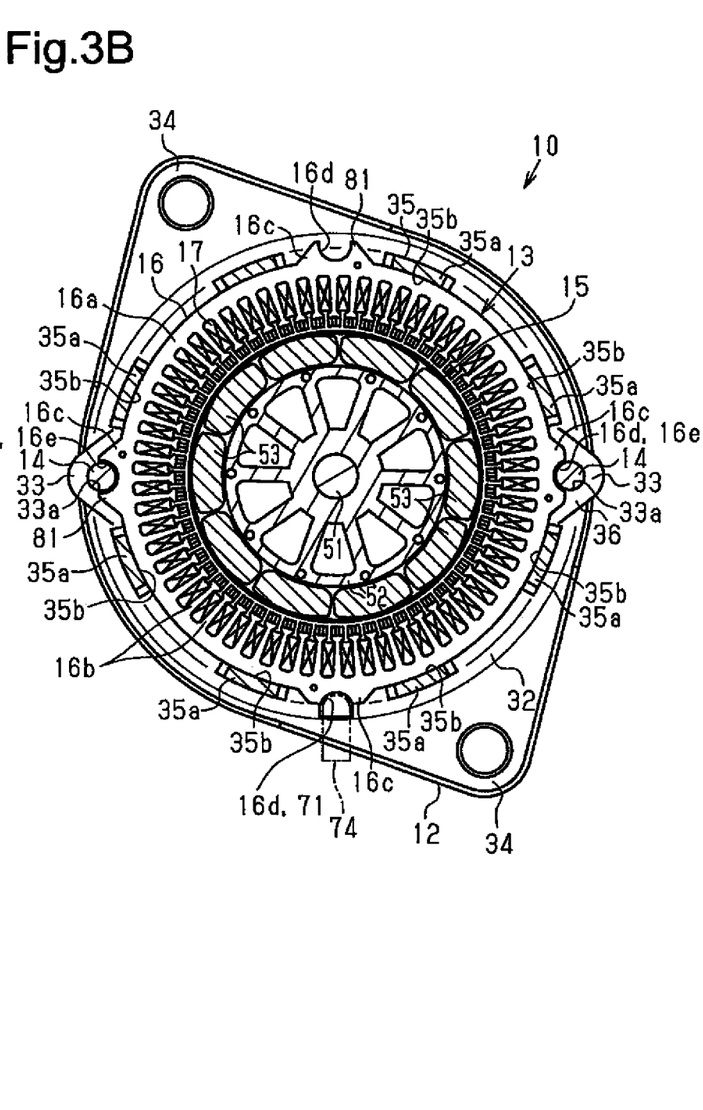
FIG. 3B is a cross-sectional view of the motor shown in FIG. 2.
Figure 4:
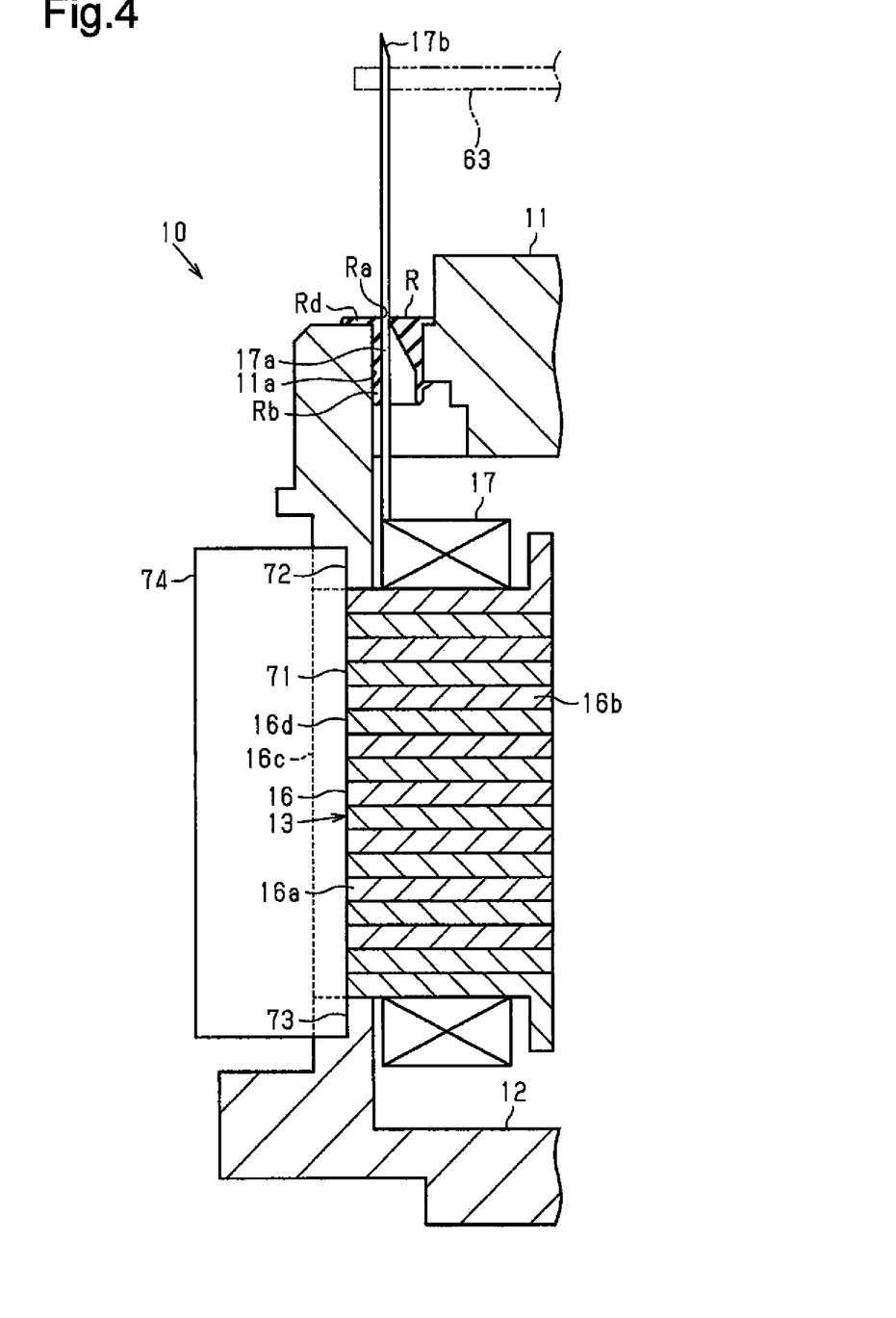
FIG. 4 is a partially cross-sectional view of the motor shown in FIG. 2.
Figure 5:
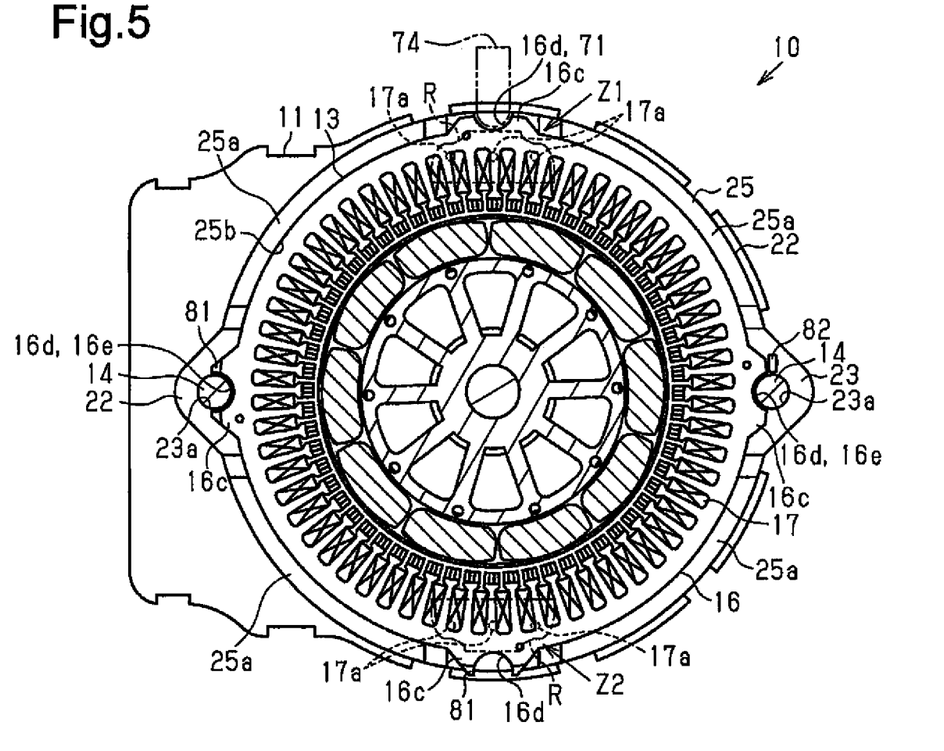
FIG. 5 is a cross-sectional view of the motor shown in FIG. 2.

As shown in FIGS. 3A, 4, and 5, insulation members R are fixed to the first frame 11 at positions separated by 180 degrees where the wiring ends 17a (one group Z1 and further group Z2) extend through. Each of the insulation members R has a through hole Ra (refer to FIG. 4), through which a tip 17b of the wiring end 17a pierces. The insulation members R are formed from a rubber material.

Figure 7:
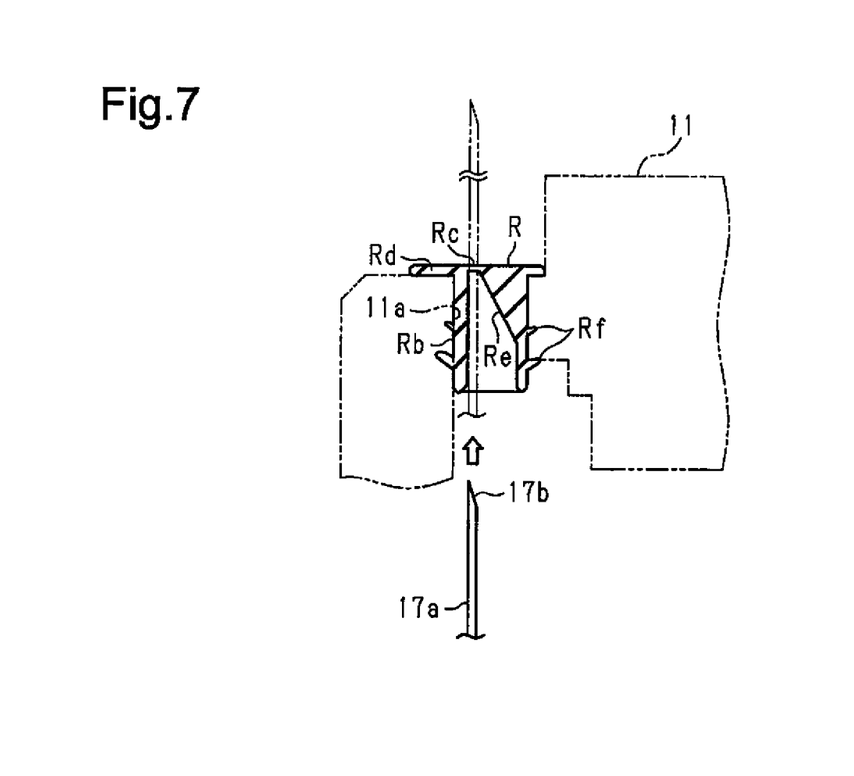
FIG. 7 is a cross-sectional view showing an insulation member of the motor shown in FIG. 2.
Figure 8:
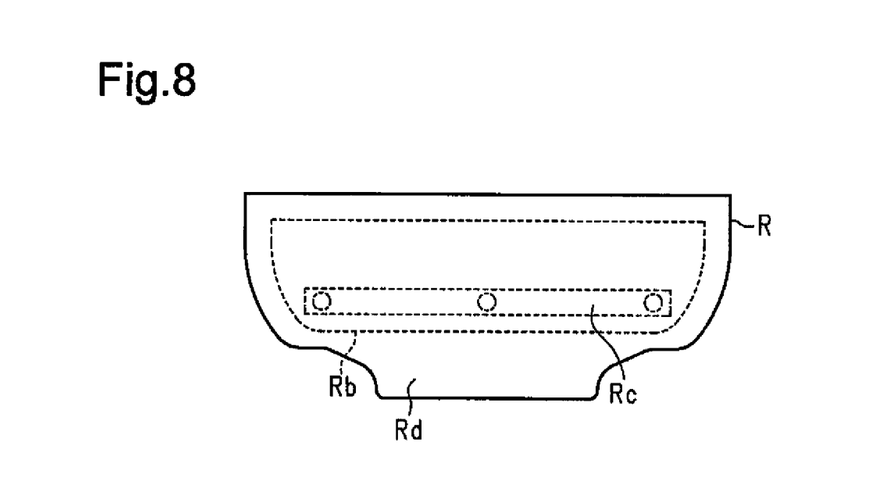
FIG. 8 is a plan view showing the insulation member of the motor shown in FIG. 2.

More specifically, as shown in FIGS. 7 and 8, the insulation member R that has just been formed does not have the through hole Ra and includes a tubular portion Rb fitted into a fitting hole 11a of the first frame 11, a thin portion Rc closing one end of the tubular portion Rb, and a flange Rd outwardly extending from one end of the tubular portion Rb. The thin portion Rc is the part that is subsequently pierced by the tip 17b of the wiring end 17a (where through hole Ra is formed). The thin portion Rc is thinner than other portions (e.g., flange Rd) in the axial direction (pierced direction). The tubular portion Rb has an inner surface defining an inclined surface Re inclined to guide the tip 17b of the wiring end 17a to the thin portion Rc. Additionally, the tubular portion Rb has an outer surface including barbs Rf that resist removal from the fitting hole 11a.

As shown in FIGS. 4 and 7, the tip 17b of the wiring end 17a is sharp. In the present embodiment, the tip 17b of the wiring end 17a includes a single inclined flat surface, which forms the sharp shape.

As shown in FIGS. 3A and 3B, the core circumference projections 16c are arranged on four positions of the outer circumferential surface of the annular portion 16a at equal angular intervals (in present embodiment, 90°) in the circumferential direction. Each core circumference projection 16c extends from one axial end to the other axial end of the annular portion 16a in the axial direction. Additionally, the core circumference projection 16c includes an arcuate recess 16d, which is outwardly open in the radial direction and serves as an accommodation recess. Each arcuate recess 16d s depressed from the distal end (radially outer end) toward the basal end of the core circumference projection 16c. The arcuate recess 16d is inwardly deeper in the radial direction toward the circumferential center of the arcuate recess 16d and is arcuate as viewed in the axial direction. The arcuate recess 16d is groove-shaped and extends through the core circumference projection 16c in the axial direction. The arcuate recess 16d has a slightly larger curvature radius than the radius of the external threaded portion of a through bolt 14. The four core circumference projections 16c include the arcuate recesses 16d at two (in FIG. 3B, left and right side) positions separated by 180 degrees in the circumferential direction. The arcuate recesses 16d serve as fastening member accommodation recesses 16e arranged to accommodate a portion (half or less) of one of cylindrical through bolts 14 extending in the axial direction.

As shown in FIG. 1, the stator core 16 is formed by punching a magnetic steel sheet to form a plurality of stator core sheets 18 through a pressing process, stacking the stator core sheets 18 in the axial direction, and integrating the stator core sheets 18 with each other through swaging. In the present embodiment, the stator core sheets 18, which are punched out and formed in the same process, are rotated by 90 degrees and stacked in the axial direction to disperse, for example, slight strains and residual stress of the magnetic steel sheet in good balance in axial and circumferential directions. Thus, the stator core 16 has good balance. Additionally, end core sheets 66 are stacked on two opposite ends of the stator core 16 in the axial direction. Each of the end core sheets 66 has an L-shaped cross section and includes a rotor opposing portion 65, which serves as an axial extension located at a radially inner side and outwardly extending in the axial direction.

This ensures the axial length of radially inner end surfaces 16f (surfaces opposed to rotor 15) of the teeth 16b while reducing the stacking thickness of the stator core 16 (entire thickness of stator core sheets 18 and end core sheets 66 that are stacked). FIG. 3A does not show the stator core sheets 18 to simplify the diagram of the stator core 16.

As shown in FIGS. 1 and 2, the first frame 11 and the second frame 12, which are located at opposite sides of the stator core 16 in the axial direction to cover opposing end surfaces of the stator core 16, are formed from a metal material through casting. The first and second frames 11, 12 respectively include first and second disk-shaped bodies 21, 31 and first and second tubular stator holders 22, 32 extending from the first and second bodies 21, 31 in the axial direction. Additionally, the first and second frames 11, 12 respectively include a plurality of first and second bolt fastening portions 23, 33 (in present embodiment, two for each frame) provided integrally with the outer circumferential surface of the first and second stator holders 22, 32 and the first and second bodies 21, 31. The first and second bolt fastening portions 23, 33 are arranged at equal angular intervals (in present embodiment, 180-degree intervals) in the circumferential direction. Each of the first bolt fastening portions 23 has a first fastening hole 23a (refer to FIG. 2) through which one of the through bolts 14 is inserted. Each of the second bolt fastening portions 33 has an internally-threaded second fastening hole 33a (refer to FIG. 3B) to which one of the through bolts 14 is coupled. When the through bolts 14 are extended through the first fastening holes 23a and coupled to the second fastening holes 33a to couple the first and second bolt fastening portions 23, 33 to each other, the first frame 11 and the second frame 12 are fixed to and integrated with each other. The second frame 12 further includes fixing portions 34 that fix the motor 10 to an external fixing position with screws (not shown). The fixing portions 34 outwardly extend from the second body 31 in the radial direction at two positions separated from the two second bolt fastening portions 33 in the circumferential direction. The motor 10 is fixed to the fixing position so that, for example, the second frame 12 is located below the first frame 11.

As shown in FIGS. 2 and 3A, the distal end of the first stator holder 22 includes a first fitting portion 25, into which one axial end (in FIG. 3A, upper end) of the stator core 16 is fitted at a radially inner side. In the same manner, the distal end of the second stator holder 32 includes a second fitting portion 35, into which the other axial end (in FIG. 3A, lower end) of the stator core 16 is fitted at a radially inner side.

The first fitting portion 25 includes a plurality of (in present embodiment, four) first fitting walls 25a arranged apart from each other in the circumferential direction. The four first fitting walls 25a are arranged at equal angular intervals (in present embodiment, 90-degree intervals) in the circumferential direction. The four first fitting walls 25a are individually arranged between adjacent ones of the core circumference projections 16c in the circumferential direction. More specifically, the core circumference projections 16c are located between adjacent ones of the first fitting walls 25a in the circumferential direction and (alternately) overlapped with the first fitting walls 25a in the circumferential direction. The core circumference projections 16c are not overlapped with the first fitting walls 25a in the radial direction. Also, the second fitting portion 35 includes a plurality of (in present embodiment, eight) second fitting walls 35a arranged apart from one another in the circumferential direction. The second fitting walls 35a are individually located at opposite sides of each of the core circumference projections 16c in the circumferential direction (i.e., two second fitting walls are located between circumferentially adjacent ones of core circumference projections 16c). More specifically, the core circumference projections 16c are located between adjacent ones of the second fitting walls 35a in the circumferential direction and overlapped with (every second one of) the second fitting walls 35a in the circumferential direction. The core circumference projections 16c are not overlapped with the second fitting walls 35a in the radial direction.

The first and second fitting portions 25, 35 (first and second fitting walls 25a, 35a) are thinner in the radial direction than basal portions of the first and second stator holders 22, 32. The first and second fitting walls 25a, 35a extend parallel to the axial direction and are arcuate in the circumferential direction as viewed in the axial direction. The width of each of the first and second fitting walls 25a, 35a is narrower in the circumferential direction from the basal end toward the distal end (distal end of the first and second stator holders 22, 32).

As shown in FIG. 1, the inner circumferential surfaces of the first and second fitting portions 25, 35, that is, radially inner side surfaces of the first and second fitting walls 25a, 35a, define first and second centering surfaces 25b, 35b allowing a shaft alignment between the first and second frames 11, 12 and the stator core 16.

The first and second frames 11, 12 further include first and second contact surfaces 26, 36 located adjacent to the basal ends of the first and second fitting portions 25, 35 in a direction orthogonal to the axes of the first and second stator holders 22, 32. The first contact surface 26 is in contact with one axial end surface (in FIG. 1, upper end surface) of the annular portion 16a fitted into the first fitting portion 25 in the axial direction. Also, the second contact surface 36 is in contact with the other axial end surface (in FIG. 1, lower end surface) of the annular portion 16a fitted into the second fitting portion 35 in the axial direction. In this state, the first frame 11 and the second frame 12 are fixed (fastened) to each other by the through bolts 14 while holding the stator 13 with the first and second stator holders 22, 32.

In the present embodiment, the first and second fitting portions 25, 35 (first and second fitting walls 25a, 35a), which are located at the distal ends of the first and second stator holders 22, 32, project from the first and second contact surfaces 26, 36 in the axial direction. Thus, in the first frame 11, the first centering surface 25b and the first contact surface 26 are located orthogonal to and close to each other. In the second frame 12, the second centering surface 35b and the second contact surface 36 are located orthogonal to and close to each other.

The first body 21 includes a recessed central portion defining a bearing receptacle 29, which allows a ball bearing B1 to be coupled from the position of the stator 13 (inner side of motor 10) in the axial direction. The bearing receptacle 29 is circular as viewed in the axial direction. The bearing receptacle 29 has a tubular inner circumferential surface extending in the axial direction. The axis of the bearing receptacle 29 is aligned with the axis of the first stator holder 22 (axis of first fitting portion 25). The first frame 11 accommodates and holds the annular ball bearing B1 in the bearing receptacle 29. Additionally, a though hole 29a extends through a central part of the bottom of the bearing receptacle 29 in the axial direction. A wave washer 41 is located between the bottom of the bearing receptacle 29 at a radially outer side of the through hole 29a and the ball bearing B1, which is accommodated in the bearing receptacle 29, to urge the ball bearing B1 toward the stator 13 in the axial direction.

The second body 31 includes a recessed central portion defining a bearing receptacle 40, which accommodates and holds an annular ball bearing B2. The bearing receptacle 40 has the form of a recess depressed from an axially outer end surface of the second frame 12 toward the inner side of the motor 10 (toward stator 13). More specifically, the bearing receptacle 40 allows the ball bearing B2 to be coupled from the outer side of the motor 10 (side opposite to stator 13). The axil of the bearing receptacle 40 is aligned with the axis of the second stator holder 32 (axis of second fitting portion 35). The second frame 12 holds the ball bearing B2 in the bearing receptacle 40 so that the ball bearing B2 is coaxial with the ball bearing B1, which is held by the first frame 11. The ball bearing B2 is in contact with the bottom of the bearing receptacle 40 in the axial direction. This performs the positioning in the axial direction. A through hole 40a extends through a central part of the bottom of the bearing receptacle 40 in the axial direction.

The rotor 15 includes a rotation shaft 51 rotationally supported by the ball bearings B1, B2 and including a central knurled portion 51a, a tubular rotor core 52 fixed to the knurled portion 51a of the rotation shaft 51 so as to integrally rotate, a plurality of permanent magnets 53 arranged in the circumferential direction to be in contact with an outer surface of the rotor core 52, and a tubular non-magnetic cover 54 covering and holding outer surfaces of the permanent magnets 53. The permanent magnets 53 are opposed to the inner circumferential surface of the stator core 16 (radially inner end surfaces 16f of teeth 16b) in the radial direction with the non-magnetic cover 54 located in between. The rotation shaft 51 has a distal end (in FIG. 1, lower end) extending through the through hole 40a and projecting from the ball bearing B2 out of the motor 10, that is, out of the second frame 12. The projected portion is attached to a joint 55 (refer to FIG. 2), which serves as an output portion. The rotation shaft 51 has a basal end (in FIG. 1, upper end) extending through the through hole 29a and projecting out of the first frame 11. A disk-shaped sensor magnet 57 is fixed to the projected portion via a fixing member 56.

As shown in FIGS. 1 and 2, a controller 61 is fixed to an outer surface of the first frame 11. The controller 61 includes a cover 62, which is fixed to the first frame 11, and a circuit board 63, which is accommodated in the cover 62. Various elements, including a magnetic sensor 63a opposed to the sensor magnet 57, is mounted on the circuit board 63. The circuit board 63 is electrically connected to the tips 17b of the wiring ends 17a. Additionally, a connector portion 64, to which an external connector (not shown) is connected to supply power to the motor 10, is fixed to the circuit board 63. The connector portion 64 is exposed out of the cover 62. When power is supplied from the external connector via the circuit board 63 to the armature windings 17, the rotor 15 rotates.

In the present embodiment, the circumference of each of the stator core 16, the first frame 11, and the second frame 12 includes circumferential positioning recesses 71 to 73, which are located in circumferential reference positions and are outwardly open in the radial direction.

More specifically, as shown in FIGS. 3A, 3B, and 5, the circumferential positioning recess 71 is defined by one of the arcuate recesses 16d of the stator core 16 separated from the fastening member accommodation recesses 16e by 90 degrees.

As shown in FIGS. 2, 3A, and 4, the first frame 11 includes the circumferental positioning recess 72, which is formed in conformance with the shape of the circumferential positioning recess 71 of the stator core 16 to be continuous with (extend to) the circumferential positioning recess 71 in the axial direction.

As shown in FIGS. 3A and 4, the second frame 12 includes the circumferential positioning recess 73, which is formed in conformance with the shape of the circumferential positioning recess 71 of the stator core 16 to be continuous with (extend to) the circumferential positioning recess 71 in the axial direction.

After the stator core 16 is coupled to the first frame 11 and the second frame 12 in the axial direction (with rough circumferential positioning), a single jig 74 is inserted through and extended over the circumferential positioning recesses 71 to 73 in the axial direction. Thus, the stator core 16, the first frame 11, and the second frame 12 are positioned (relative to each other) in the circumferential direction with high accuracy. The jig 74 is arcuate as viewed in the axial direction so that one end of the jig 74 is accommodated in the circumferential positioning recesses 71 to 73 with almost no gap. Also, the axial length of the jig 74 is set to be equal to or less than the length of the successive circumferential positioning recesses 71 to 73.

Additionally, as shown in FIG. 5, the stator core 16 and the first frame 11 of the present embodiment include extensions 81 and a projection 82 serving as erroneous coupling restriction portions, which allow coupling in the axial direction only when the relative position of the stator core 16 and the first frame 11 in the circumferential direction is set to a predetermined position.

More specifically, in the present embodiment, the one group Z1 and the further group Z2 of the wiring ends 17a are separated from each other by 180 degrees. With a structure that does not include the extensions 81 and the projection 82, the stator 13 may be erroneously coupled to the first frame 11 at a relative position of a 180-degree error. The extensions 81 and the projection 82 are provided to prevent such erroneous coupling.

More specifically, the extensions 81 of the stator core 16 are only arranged on the end core sheets 66. The extensions 81 further outwardly extend in the radial direction from two circumferentially adjacent ones (separated by 90 degrees) of the core circumference projections 16c of the end core sheet 66.

The projection 82 projects from the first frame 11 in the axial direction. When the relative position of the stator core 16 and the first frame 11 is not set to the predetermined position, the projection 82 interferes with one of the extensions 81 in the axial direction to prevent coupling of the stator 13 and the first frame 11 in the axial direction.

More specifically, when the stator 13 (stator core 16) is coupled to the first frame 11 so that the wiring ends 17a extend through the insulation members R at the relative position of a 180-degree error, the projection 82 and the extension 81 interfere with each other in the axial direction to prevent the coupling in the axial direction.

Figure 6:
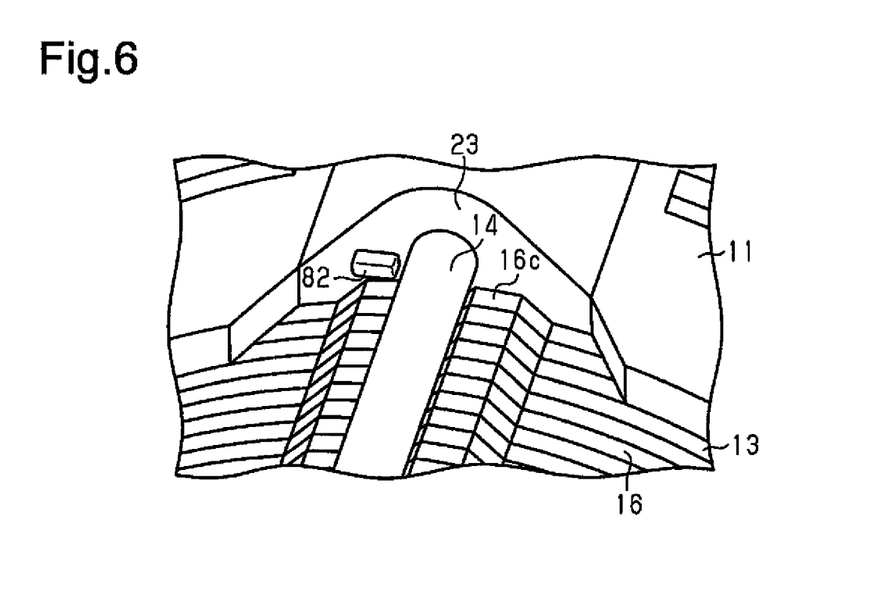
FIG. 6 is a partially enlarged perspective view of the motor shown in FIG. 2.

As shown in FIGS. 5 and 6, when the stator 13 (stator core 16) is coupled to the first frame 11 so that the wiring ends 17a extend through the insulation members R at the predetermined proper relative position, the extensions 81 and the projection 82 will not interfere with each other and allow the coupling in the axial direction.

A method for manufacturing the motor 10 having the above structure and the operation of the motor 10 will now be described.

The method for manufacturing the motor 10 of the present embodiment includes a step of fixing the insulation members R to the first frame 11 at locations where the wiring ends 17a extend through (where fitting holes 11a are formed). The method for manufacturing the motor 10 further includes a step of relatively moving the first frame 11 and the stator 13 (stator core 16) in the axial direction and forming the through holes Ra in the insulation members R by piercing the insulation members R (thin portions Rc) with the tips 17b of the wiring ends 17a so that the wiring ends 17a extend through the first frame 11. This guides the tips 17b of the wiring ends 17a to the outside of the first frame 11 and later allows the tips 17b of the wiring ends 17a to be electrically connected to the circuit board 63.

The method for manufacturing the motor 10 of the present embodiment further includes a step of relatively moving the first frame 11 and the stator core 16 and the second frame 12 in the axial direction to couple to each other in the axial direction and then inserting the jig 74 into the circumferential positioning recesses 71 to 73, which are formed in the circumferences of the stator core 16, the first frame 11, and the second frame 12, extending over in the axial direction. With this state maintained, the first frame 11 and the second frame 12, which hold the stator core 16 in between in the axial direction, are fastened by the through bolts 14. This prevents a situation in which, for example, the stator core 16 is slightly misaligned with the second frame 12 in the circumferential direction, causing the through bolts 14 to interfere with the second bolt fastening portions 33 instead of being inserted into the second fastening holes 33a of the second frame 12.

The above embodiment has the advantages described below.

(1) The circumferences of the stator core 16, the first frame 11, and the second frame 12 include the circumferential positioning recesses 71 to 73. The circumferential positioning recesses 71 to 73 are located in the circumferential reference positions and are outwardly open in the radial direction. After coupling the stator core 16 and the first frame 11 and the second frame 12 in the axial direction, the jig 74 is inserted into the circumferential positioning recesses 71 to 73 extending over in the axial direction. Thus, the stator core 16, the first frame 11, and the second frame 12 are held with the positioning performed in the circumferential direction. In the present embodiment, the single jig 74 simultaneously performs the positioning on all of the stator core 16, the first frame 11, and the second frame 12 in the circumferential direction. This facilitates subsequent coupling of the through bolts 14.

(2) Each of the circumferential positioning recesses 71 to 73 is inwardly deeper in the radial direction toward its circumferential center. It is preferred that the circumferential positioning recesses 71 to 73 be arcuate. This allows the jig 74 to be inserted into the circumferential positioning recesses 71 to 73 from a radially outer side even when the circumferential positioning recesses 71 to 73 are slightly misaligned with the jig 74 in the circumferential direction. Further, as the jig 74 is inserted, the slight circumferential misalignment is corrected.

(3) The circumference of the stator core 16 includes the arcuate recesses 16d, which are outwardly open in the radial direction and arranged at equal angular intervals in the circumferential direction. Thus, the stator core 16 has good balance (same patterns) in the circumferential direction. Additionally, two of the arcuate recesses 16d serve as the fastening member accommodation recesses 16e, which partially accommodate the through bolts 14 to prevent rotation of the stator core 16. Further, one of the arcuate recesses 16d serves as the circumferential positioning recess 71 to perform the positioning in the circumferential direction and facilitate the coupling.

(4) The arcuate recesses 16d are arranged at 90-degree intervals. Two of the arcuate recesses 16d separated from each other by 180 degrees serve as the fastening member accommodation recesses 16e. One of the arcuate recesses 16d located at a position separated from the fastening member accommodation recesses 16e by 90 degrees serves as the circumferential positioning recess 71. Thus, the stator core 16, the first frame 11, and the second frame 12 are firmly fastened to each other in good balance. Further, the positioning of the stator core 16, the first frame 11, and the second frame 12 is performed in the circumferential direction.

(5) The stator core 16 includes the stator core sheets 18, which are formed through punching. The stator core sheets 18 are rotated by 90 degrees and stacked in the axial direction. Thus, the stator core 16 has good balance in the axial and circumferential directions. In other words, while the stator core 16 has good balance in the axial and circumferential directions, the stator core 16, the first frame 11, and the second frame 12 are firmly fastened to each other in good balance. Additionally, the positioning of the stator core 16, the first frame 11, and the second frame 12 is performed in the circumferential direction.

In other words, in the present embodiment, the arcuate recesses 16d are formed at each 90 degrees so that the stator core sheets 18 are rotated by 90 degrees and stacked in the axial direction and so that the through bolts 14 are partially accommodated. Further, one of the arcuate recesses 16d serves as the circumferential positioning recess 71. Thus, while the stator core 16 has good balance, the positioning is performed.

(6) The stator core 16 and the first frame 11 include the extensions 81 and the projection 82 serving as the erroneous coupling restriction portions, which allow coupling in the axial direction only when the relative position of the stator core 16 and the first frame 11 in the circumferential direction is set to the predetermined position. Thus, when the relative position in the circumferential direction is not set to the predetermined position, coupling in the axial direction, that is, erroneously coupling is prevented.

(7) The armature windings 17 include a number of segment conductors having the wiring ends 17a. The wiring ends 17a extend through the first frame 11 toward one side in the axial direction. The groups Z1, Z2 of the wiring ends 17a are separated from each other by 180 degrees. This easily allows the stator 13 to be erroneously coupled to the first frame 11 at the relative position of a 180-degree error. However, such erroneous coupling is avoided.

(8) The extensions 81, which serve as the erroneous coupling restriction portions of the stator core 16, are only arranged on the end core sheets 66 stacked on the axial ends. Thus, the remaining stator core sheets 18 may have a simple shape so that the same pattern repeats in the circumferential direction. Additionally, each of the end core sheets 66 includes the rotor opposing portion 65, which is located at a radially inner side and outwardly extends in the axial direction. This ensures the axial length of the radially inner end surfaces 16f (surfaces opposed to rotor 15) of the teeth 16b while reducing the stacking thickness of the stator core 16. The extensions 81 and the rotor opposing portion 65 concentrate on the end core sheets 66, which differ in kind from the remaining stator core sheets 18. Thus, the advantage is obtained without an increase in the number of components (item numbers of the manufacturer).

(9) The erroneous coupling restriction portions of the stator core 16 are the extensions 81 outwardly extending from a circumferential portion in the radial direction. The erroneous coupling restriction portion of the first frame 11 is the projection 82 projecting in the axial direction to interfere with the extensions 81 in the axial direction at positions other than the predetermined position. The interference of the projection 82 with the extensions 81 particularly prevents erroneous coupling.

It should be apparent to those skilled in the art that the present invention may be embodied in many other specific forms without departing from the scope of the invention. Particularly, it should be understood that the present invention may be embodied in the following forms.

In the above embodiment, each of the circumferential positioning recesses 71 to 73 is inwardly deeper in the radial direction toward its circumferential center (preferably, circumferential positioning recesses 71 to 73 are arcuate). Instead, for example, the recess does not have to be arcuate and inwardly deeper in the radial direction toward the circumferential center of the recess. The circumferential positioning recess may have a constant depth.

In the above embodiment, the circumference of the stator core 16 includes the arcuate recesses 16d located at equal angular (90-degree) intervals in the circumferential direction. Two of the arcuate recesses 16d serve as the fastening member accommodation recesses 16e, which partially accommodate the through bolts 14. One of the arcuate recesses 16d serves as the circumferential positioning recess 71. However, a different structure may be used. For example, the stator core 16 includes the stator core sheets 18, and the stator core sheets 18 are rotated by 90 degrees and stacked in the axial direction. Instead of this structure, the stator core sheets 18 may be stacked without being rotated, and the angular intervals at which the fastening member accommodation recesses 16e and the circumferential positioning recess 71 are located may be changed to other angular intervals. For example, the circumferential positioning recess 71 may be located at a position separated from the fastening member accommodation recesses 16e by an angle other than 90 degrees.

In the above embodiment, the circumferences of the stator core 16, the first frame 11, and the second frame 12 include the circumferential positioning recesses 71 to 73. Instead, the circumference of the stator core 16 and the circumference of one of the first frame 11 and the second frame 12 may include circumferential positioning recesses. In this case, although the other one of the first frame 11 and the second frame 12 cannot be positioned by the jig 74 in the circumferential direction, the stator core 16 and one of the first frame 11 and the second frame 12 will be positioned. Therefore, in this case, for example, while the other one of the first frame 11 and the second frame 12 is later positioned in the circumferential direction and held by a means other than the jig 74, the through bolts 14 may be easily coupled.

In the above embodiment, the armature windings 17 include a number of segment conductors, and the wiring ends 17a of the segment conductors extend through the first frame 11 toward one side in the axial direction. Additionally, the groups Z1, Z2 of the wiring ends 17a are separated from each other by 180 degrees. Instead of this structure, the armature windings 17 may be changed to armature windings (winding ends) having a different structure. For example, the armature windings 17 may be armature windings formed by a conductive wire wound around teeth.

In the above embodiment, the extensions 81, which serve as the erroneous coupling restriction portions of the stator core 16, are only arranged on the end core sheets 66 stacked on the axial ends. Instead, extensions may be provided on a stator core sheet stacked on a position other than the axial ends. Alternatively, extensions may be provided on a stator core that does not have a stacking structure.

In the above embodiment, each of the end core sheets 66 includes the rotor opposing portion 65, which is located at a radially inner side and outwardly extends in the axial direction. Instead, the extensions 81 may be arranged on an end core sheet that does not include the rotor opposing portion 65.

In the above embodiment, the erroneous coupling restriction portions of the stator core 16 are the extensions 81 outwardly extending from a circumferential portion in the radial direction. The erroneous coupling restriction portion of the first frame 11 is the projection 82 projecting in the axial direction. However, a different shape may be used as long as erroneous coupling is prevented. For example, the erroneous coupling restriction portion of the stator core 16 may be a projection projecting in the axial direction, and the erroneous coupling restriction portion of the first frame 11 may be a flat surface that interferes with the projection in the axial direction at positions other than the predetermined position. In this case, the first frame 11 needs to include a recess into which the projection fits when the relative position in the circumferential direction is set to the predetermined position.

In the above embodiment, the stator core 16 and the first frame 11 include the extensions 81 and the projection 82 serving as the erroneous coupling restriction portions. Additionally, the second frame 12 may include an erroneous coupling restriction portion in the same manner.

The present examples and embodiments are to be considered as illustrative and not restrictive, and the invention is not to be limited to the details given herein, but may be modified within the scope and equivalence of the appended claims.

The invention claimed is:

1. A motor comprising:
   a stator including a stator core and an armature winding, wherein the stator core includes a plurality of teeth inwardly extending in a radial direction, and the armature winding is wound around the teeth;
   a first frame arranged to cover one end surface side of the stator in an axial direction;
   a second frame arranged to cover another end surface side of the stator in the axial direction; and
   a fastening member that fastens the first frame and the second frame to each other with the stator core held by the first frame and the second frame in the axial direction, wherein
   each of the stator core, the first frame, and the second frame includes a circumference,
   the circumference of the stator core and the circumference of at least one of the first frame and the second frame each include a circumferential positioning recess,
   the circumferential positioning recess is arranged at a circumferential reference position and is outwardly opened in the radial direction,
   each of the stator core and at least one of the first frame and the second frame includes an erroneous coupling restriction portion that allows coupling in the axial direction only when a relative position of the stator core and at least one of the first frame and the second frame is set to a predetermined position in the circumferential direction, and the erroneous coupling restriction portion included in the at least one of the first frame and the second frame exposes to an outside the stator core.

2. The motor according to claim 1, wherein the circumferential positioning recess is inwardly deeper in the radial direction toward a circumferential center of the circumferential positioning recess.

3. The motor according to claim 1, wherein each of the circumference of the stator core, the circumference of the first frame, and the circumference of the second frame includes the circumferential positioning recess.

4. The motor according to claim 1, wherein
the circumference of the stator core includes accommodation recesses that are outwardly open in the radial direction and arranged at equal angular intervals in a circumferential direction,
at least one of the accommodation recesses serves as a fastening member accommodation recess that partially accommodates the fastening member, and
at least one of the accommodation recesses serves as the circumferential positioning recess.

5. The motor according to claim 4, wherein
the accommodation recesses are arranged at 90-degree intervals,
ones of the accommodation recesses separated from each other by 180 degrees each serve as the fastening member accommodation recess, and
one of the accommodation recesses separated from the fastening member accommodation recess by 90 degrees serves as the circumferential positioning recess.

6. The motor according to claim 5, wherein
the stator core includes a plurality of stator core sheets formed through punching, and
the stator core sheets are rotated by 90 degrees and stacked in the axial direction.

* * * * *